Aug. 15, 1950 B. O'BRIEN ET AL 2,518,632
ANTIOSCILLATION MOUNTING FOR OPTICAL INSTRUMENTS
SUCH AS TELESCOPES, CAMERAS, AND THE LIKE
Filed June 20, 1945 5 Sheets-Sheet 1

INVENTORS
Brian O'Brien
By Hobert W. French, Jr.
Edward L. Dumpston
Their Attorney Aug. 15, 1950 B. O'BRIEN ET AL 2,518,632
ANTIOSCILLATION MOUNTING FOR OPTICAL INSTRUMENTS
SUCH AS TELESCOPES, CAMERAS, AND THE LIKE
Filed June 20, 1945 5 Sheets-Sheet 2

INVENTORS
Brian O'Brien
By Hobert W. French, Jr.
Edward H. Cumpston
their Attorney Aug. 15, 1950  B. O'BRIEN ET AL  2,518,632
ANTIOSCILLATION MOUNTING FOR OPTICAL INSTRUMENTS
SUCH AS TELESCOPES, CAMERAS, AND THE LIKE
Filed June 20, 1945  5 Sheets-Sheet 3

INVENTORS
Brian O'Brien
Hobert W. French, Jr.
BY
Edward L. Cumpston
their Attorney Patented Aug. 15, 1950

2,518,632

UNITED STATES PATENT OFFICE 2,518,632

ANTIOSCILLATION MOUNTING FOR OPTICAL INSTRUMENTS SUCH AS TELESCOPES, CAMERAS, AND THE LIKE

Brian O'Brien, Pittsford, and Hobert W. French, Jr., Brighton, N. Y.

Application June 20, 1945, Serial No. 600,452

17 Claims. (Cl. 88—36)

This invention relates to anti-oscillation mountings for optical instruments, such as telescopes, binoculars, cameras and the like, for the purpose of absorbing and preventing the transmission to such instruments of vibratory motions such as caused, for example, by the motors of an airplane and which would otherwise tend to blur and obscure the magnified images formed by the optical systems of the instruments.

One object of the invention is the provision of an improved and more efficient mounting of the above character capable of absorbing and eliminating oscillational vibrations tending to blur and obscure an optical image.

Another object is to provide a stabilizing mounting such as described adapted to effectively maintain the desired direction of the instrument toward the object or target.

Another object is to provide such a mounting comprising a perfectly balanced instrument in a frictionless set of gimbals having applied thereto a frictionless restraining or restoring torque substantially proportional to the angular displacement and a frictionless damping torque substantially proportional to the angular velocity.

Another object is to produce such a gimbal mounting having each of its movable elements provided with an elastic, shock-proof restoring means and air flow damping means combined in a unitary, substantially frictionless device.

Another object is to provide a mounting of the nature indicated, comprising conveniently manipulated means for adjusting the restoring and damping means so as to maintain the gimbal parts in predetermined neutral positions.

Another object is to provide a mounting of the character described provided with conveniently accessible means for adjusting the interpupillary distance of the optical systems of a binocular instrument, without substantially affecting the center of gravity of the movable gimbal elements of the mounting.

A further object is to produce such a mounting equipped with efficient head rest and eye cup means adjustably supported independently of the movable gimbal system.

Still a further object is the production of such a mounting in a construction adapted to be readily and economically manufactured, assembled and maintained in operating condition.

To these and other ends the invention resides in certain improvements and combinations of parts, all as will be hereinafter more fully described, the novel features being pointed out in the claims at the end of the specification.

We have discovered, by a course of extended and intensive research and empirical tests, that vibration of an instrument as a whole, with any amplitude or frequency, has no appreciable effect in blurring the optical image, provided the vibration is confined to pure translation, and also that rotation of the telescope about an axis parallel to its optic axis leaves the image undisturbed. The condition to be fulfilled, therefore, is that the direction of the optic axis of the instrument shall remain unchanged, or, in other words, that the instrument shall not rotate or oscillate as a whole about any axis perpendicular to the optic axis.

Since the problem is thus one of eliminating oscillation of the optical axis, the ideal system would be a perfectly balanced instrument in a frictionless set of gimbals having its axes extending normally or perpendicularly to the optical axis of the instrument. An instrument so mounted, however, and subjected to rotational vibration, tends to drift in space, away from the desired object or target, so as to be of little use.

It has been found that such a mounting, to be useful, requires the application of a restoring force to maintain the telescope, or other instrument, in a desired direction. Such restoring force, however, cannot be gravitational, since this would require a shift of the center of gravity of the instrument out of the gimbal axes and this, in turn, would cause translational vibration to be converted into rotational vibration so as to defeat the object of the mounting. This difficulty has been overcome by application of an elastic restoring force independent of the action of gravity.

It has been further found that if the gimbals are restrained by springs, rotational vibrations transmitted through them to the telescope will be much reduced in amplitude, provided the vibration frequencies are well above the natural frequency of the spring-restrained gimbal system. With this arrangement, however, shock excitations will result in oscillation of the system with its own natural period, so as to be unsatisfactory. We have successfully solved this problem by the application of substantially frictionless and shock-free, elastic and damping forces, for restraining the oscillation of the instrument and restoring it to neutral position.

Figure 1:
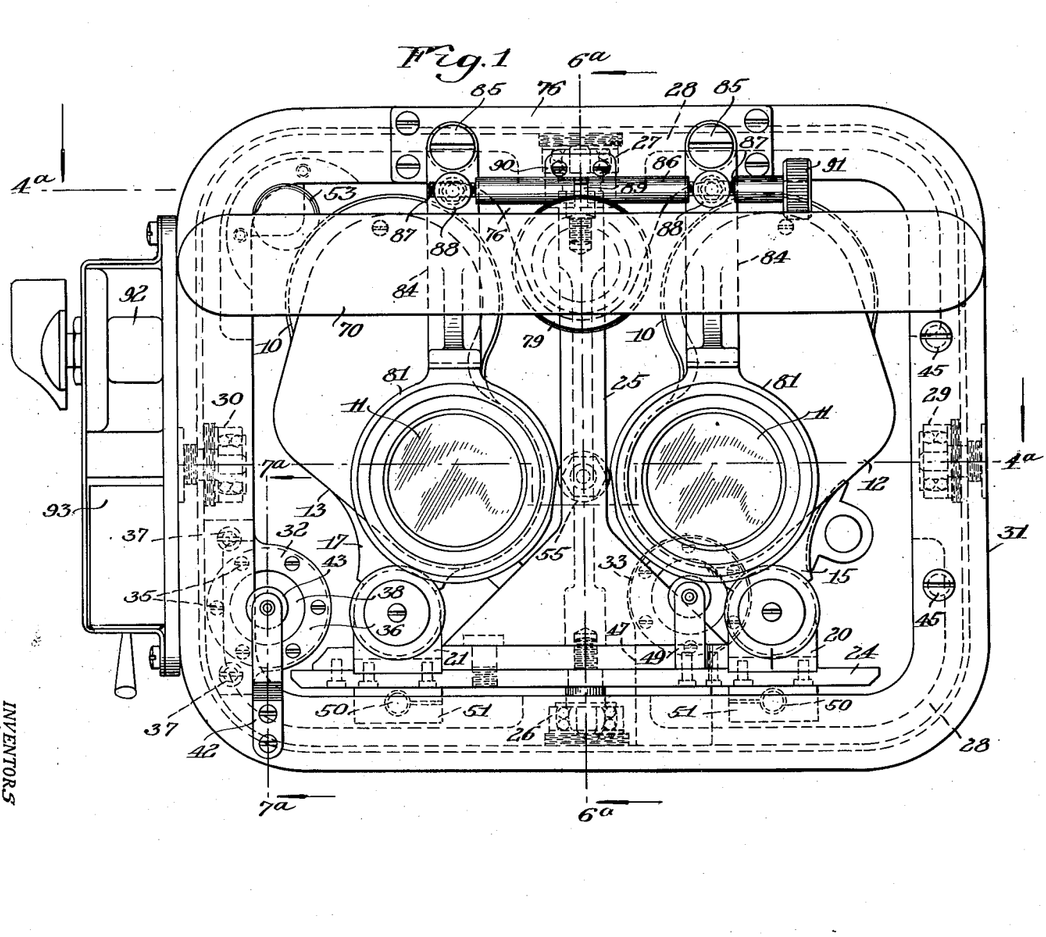
Fig. 1 is an elevation of a mounting embodying the present invention as applied to the support of a binocular instrument, viewed from its eyepiece side.
Figure 2:
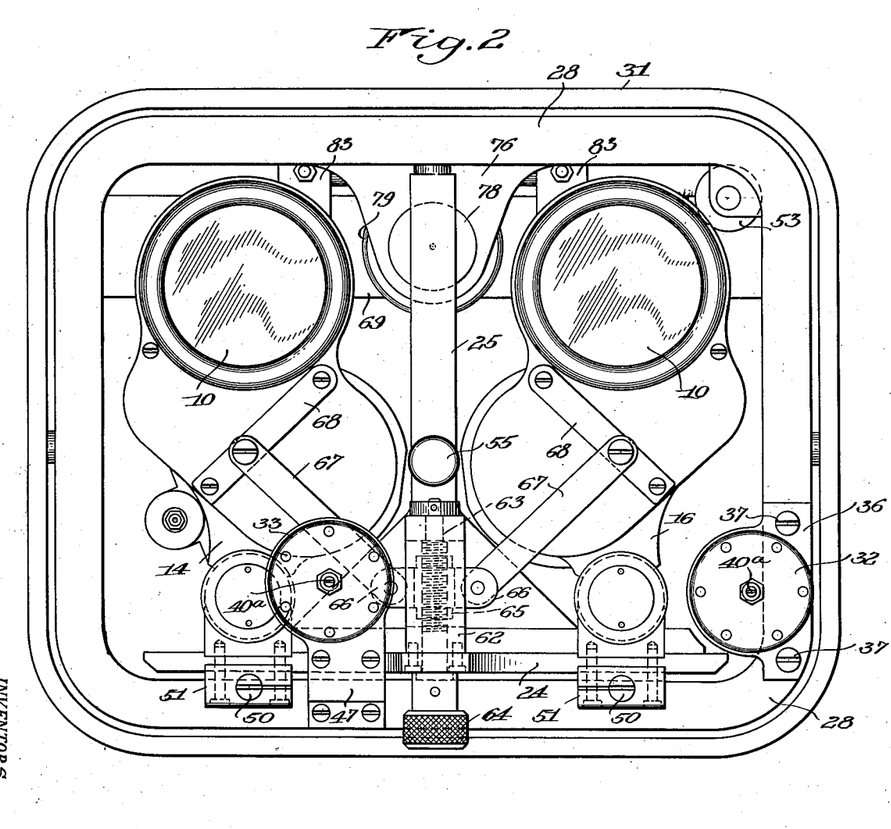
Fig. 2 is a similar elevation viewed from the objective side of the instrument.

In the preferred embodiment, herein disclosed by way of illustration, the invention is applied to the support of a binocular telescope of the known prism-erecting type, having objectives 10, Figs. 1 and 2, and eye-pieces 11, in spaced optical systems contained in separate body castings, 12 and 13, respectively, mounted on hinges for movement toward and from each other to adjust the interpupillary distance. To this end, each of the castings 12 and 13 is formed with a pair of spaced hinge ears 14, 15, and 16 and 17, rotatably mounted on spindles, 18 and 19, carried by lugs 20, 21, and 22 and 23, respectively, fixed on a bed plate 24. Fixed on and rising vertically from the center of the bed plate is a pillar 25, of generally I-beam section, the bed and pillar forming the inner one of a pair of gimbal elements. The bed 24 and the upper end of the pillar are supported in anti-friction ball bearings 26 and 27, hereafter described, for rotation as a rigid element about a substantially vertical axis.

The bearings 26 and 27 of the inner gimbal element are mounted in an outer gimbal element, or ring, 28, of generally rectangular outline and rigid, U-shaped section, as shown, which is provided, at opposite sides, with anti-friction ball bearings, 29 and 30, for rotation about a substantially horizontal axis. These bearings are supported by a ring-like, substantially rectangular frame 31, preferably of rigid, L-shaped cross section, as shown, and enclosing and protecting the gimbal elements. The frame 31 is rigidly attached, by any suitable means, to an aircraft, or other support. The central assembly comprising the telescope supporting hinges, the bed 24 and pillar 25, are so rigid that no flexures within the angular tolerance required for telescope stabilization can occur, due to any translational vibrations encountered in use.

The axes of the gimbal elements are preferably co-planar and intersect each other at a substantial included angle, being preferably normal to each other, and these axes are normal to the optical axes of the two optical systems of the binocular telescope. The vertical axis contains the center of gravity of the inner gimbal element and instrument assembly and the horizontal axis contains the center of gravity of the assembly of the inner and outer gimbal elements, so that the intersection of these axes contains the center of gravity of the moving system, thus producing a balanced instrument in a substantially frictionless set of gimbals, the two axes of which are perpendicular to the optical axis of the instrument. An instrument so mounted, however, and subjected to translational and rotational vibrations, would tend to drift in space so that the optical axis would not remain on the target, unless provided with suitable means for maintaining the optical axis in a desired direction, which will now be described.

Such means preferably comprises a combination of substantially frictionless, shock-proof, elastic and damping means. Such restoring and damping means are provided for each gimbal element and are advantageously embodied in a unitary device, indicated generally at 32 for the outer element and at 33 for the inner element. As this device is the same for each gimbal element, a description of one will apply to both.

Figures 6, 7, 8:
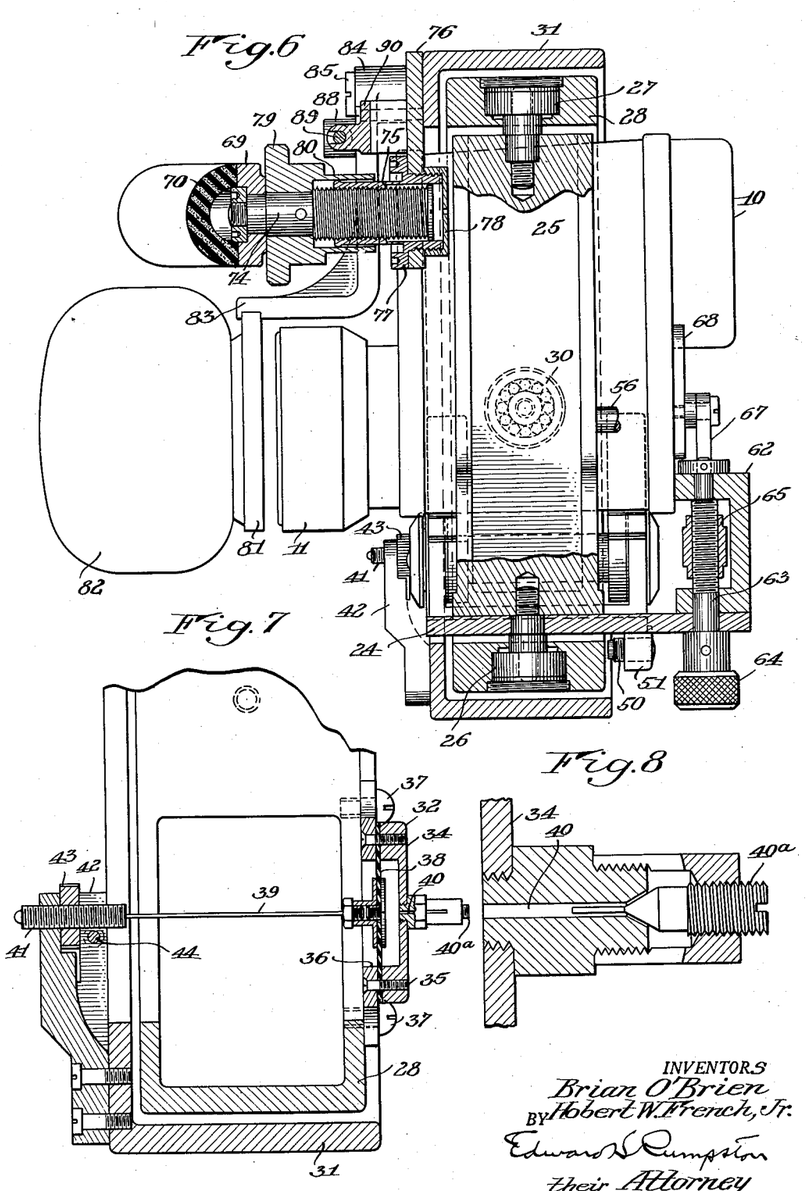
Fig. 6 is a sectional elevation on the line $6a$—$6a$ in Fig. 1.
Fig. 7 is a fragmentary enlarged sectional elevation on the line $7a$—$7a$ in Fig. 1.
Fig. 8 is a fragmentary enlargement in full section of vent parts shown in Fig. 7.

The restoring and damping device 32 for the outer gimbal element 28 is best shown in Fig. 7, comprising a shallow, cup-like container 34 secured by means of screws 35 to a bracket 36, which is fixed, as by screws 37, on the gimbal element 28. Interposed between the container and bracket is an elastic circular diaphragm 38, preferably cut from a thin sheet of rubber or neoprene, about .005 of an inch thick, which is stretched slightly and clamped between the container and bracket by means of the plurality of screws 35. The center of the diaphragm is connected with the frame 31, by means of a wire rod 39, as hereafter more fully described, so that as the gimbal element 28 and frame 31 vibrate with respect to each other, the elastic diaphragm is moved back and forth against its elastic resistance, forcing air in and out through a small bore or vent 40 in the container 34. The diameter of this bore is very small compared with its length, in the ratio of, say one to twenty, so that the air flow is not turbulent but streamlined and creates a viscous friction which affords highly effective damping for the vibrating system. The effective diameter of the vent is preferably adjustable, as by means of a suitable screw valve, as shown at 40a and the torque force is predetermined to produce a period of oscillation substantially longer than the period of impressed vibration.

The means for connecting the elastic diaphragm 38 with the frame comprises the rod 39, preferably of piano wire rigid enough to act in compression as well as in tension. One end of the wire is fixed by any suitable plate clamping means, as shown, to the central portion of the diaphragm, while the opposite end of the wire is fixed to a small screw 41 sliding longitudinally in a split bracket fitting 42. A knurled nut 43, threadedly engaged with the screw, is trapped between the parts of the fitting, as shown, so that rotation of the nut moves the screw longitudinally to adjust the neutral position of the diaphragm and the gimbal element on which it is carried. A screw 44 serves to clamp the parts of the fitting against the screw 41, to retain it in adjusted position. Additional means may be provided, if so desired, for holding the screw against rotation, such as a longitudinal spline in the screw 41 engaged by a pin in the fitting 42, as well understood in the art, but it has been found that by giving the nut 43 a loose threaded engagement with the screw, such adjustments may be made without applying any substantial torsional force to the screw and rod.

Opposed stops are provided for limiting the excursions of the outer gimbal element 28, comprising screws 45 (Figs. 1 and 4), preferably of hard plastic material, adjustably threaded in openings in frame 31, for engagement with the gimbal ring 28 on opposite sides of its axis of rotation. By adjusting the nut 43, this gimbal element may be elastically restored to and retained in a neutral position for rotation about its horizontal axis, midway between the stops 45 on the supporting frame.

The elastic restoring and damping device 33, constructed as described above, is similarly interposed between the outer element, or ring 28, and bed 24 of the inner element. To this end, the diaphragmed and vented container of device 33 is mounted on a bracket 47 (Figs. 2 and 4) fixed on frame 28 with its wire rod 48 adjustably connected, as described above, with a split bracket fitting 49 (Fig. 1) fixed on bed 24. Opposed plastic stop screws 50 (Fig. 2) are adjustably threaded in brackets 51 screwed to bed 24, for engagement with ring 28 on opposite sides of the vertical axis of the inner element or bed, so as to limit its excursions. By turning the nut 52 trapped in the fitting 49 (Fig. 4), rod 48 is adjusted in length, so as to adjust the inner element, or bed, 24, to neutral position between the stop screws 50.

Figure 3:
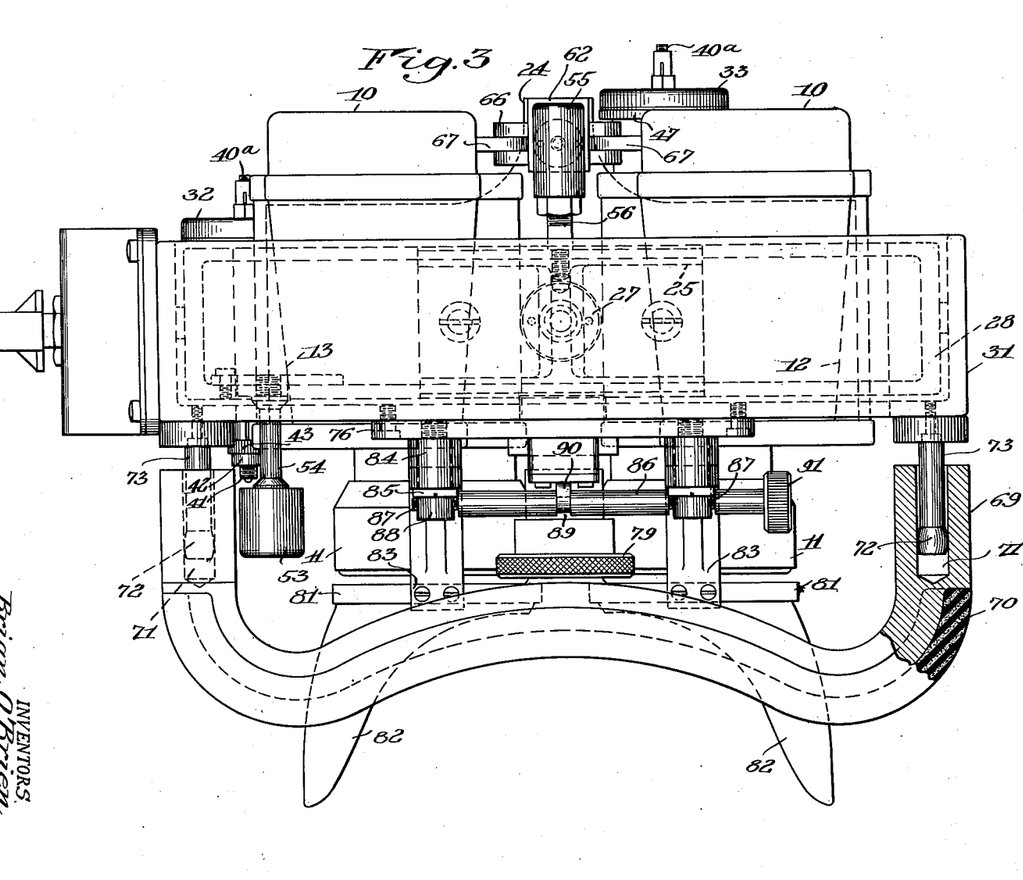
Fig. 3 is a top plan view of the same.

A counterweight 53 (Figs. 1 and 3) is threadedly adjustable on a spindle 54 fixed in frame 28 for adjustably maintaining the center of gravity of the movable system in the horizontal axis of the outer element 28. A similar counterweight 55 is threadedly adjustable on a spindle 56 fixed in the pillar 25 for the same purpose.

It will be evident from the above construction that the rubber diaphragm affords a shock-proof, elastic restoring force, substantially free of static friction and independent of gravity, which is substantially proportional to the angular displacement of the gimbal elements. Air flow damping means of the construction described produces a streamlined, viscous flow which is substantially proportional to the angular velocity and produces a dash-pot which is substantially free of static friction and generally suitable for aircraft and other uses. It is further evident that the rubber diaphragm, employed as an elastic wall of the dash-pot chamber, thus serves a double function, the construction as a whole being exceedingly simple in its construction and efficient for its intended purposes.

Figures 4, 5:
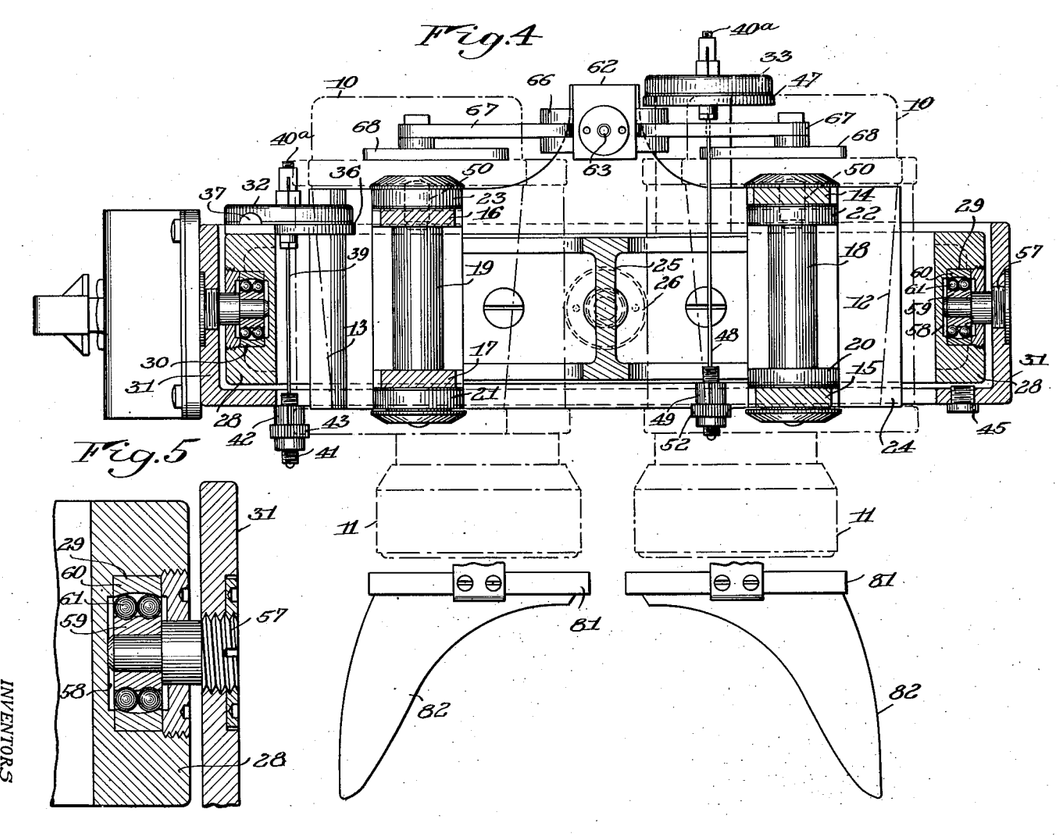
Fig. 4 is a sectional plan view on the line $4a$—$4a$ in Fig. 1.
Fig. 5 is a fragmentary enlargement of bearing parts as shown in Fig. 4.

The anti-friction ball bearings for supporting the elements for rotation about their axes are substantially the same for each element and are best shown in connection with the outer ring element, 28, in Figs. 4 and 5. Each side of frame 31 is formed with a bore in which a trunnion 57 is threadedly engaged. The inner end of the trunnions projects into a recess 58 in the side of ring 28 and carries an inner race ring 59 having a pair of toric grooves in its outer race surface, as shown. An outer race ring 60 is mounted in the recess and has a toric inner race surface, as shown. Ball bearings 61 are interposed between the race surfaces, the curvatures of which prevent axial movement of the outer race surface and of the ring 28 relative to the frame, so as to be self-aligning. To further insure the elimination of any vibration longitudinally of the axis of ring 28, one of the trunnions 57 is threadedly adjustable for adjusting the race 59 carried thereby, so as to take up any slack in the bearing, and one of the bearings of the vertical axis of the inner element is similarly adjustable.

The means for interpupillary adjustment of the optical systems comprises, preferably, a bracket 62 (Figs. 2 and 6), on bed 24, in which a spindle 63 is mounted for rotation by means of a knurled handle 64. A nut 65 threadedly mounted on the spindle is provided with opposed lateral lugs 66, each having a link 67 pivotally connected therewith, as shown. The other end of each link is pivotally connected with a strap 68 fixed on the casting of the corresponding optical system, and it will be apparent from this construction that rotation of handle 64 serves to swing each casting about its hinged spindle 18, so as to vary the interpupillary spacing. Such opposite movements of the two systems, substantially parallel with the horizontal axis of the outer gimbal element 28, and normal to the vertical axis of the inner element, has no appreciable effect upon the position of the center of gravity of either element. Handle 64 is readily accessible for convenient operation, even by a gloved hand.

Means are provided for protecting the movable system from obstruction by contact with the observer's head, comprising a head rest and eye cups rotatably attached to the outer frame. The head rest is preferably in the form of an elongated bar 69 (Figs. 3 and 6), made of light metal and suitably curved, as shown, for contact with the head. The forward side of the bar is cushioned with a pad 70 of sponge rubber. To further accommodate the bar comfortably to various skull contours, it is mounted with a back and forth adjustment on supporting frame 31. For this purpose, the ends of the bar are turned parallel with each other toward the frame and recessed, as at 71, for the reception of a closely fitted rounded head 72 on a forward end of a stud 73 fixed on the frame. The center of the bar has rotatably mounted therein a spindle 74 threadedly engaged within the bore of a sleeve 75 having its inner end mounted in an opening in a bracket 76 fixed on the frame 31, the bracket being clamped between a flange 77 on the sleeve and a cap 78 threadedly engaged with the sleeve on the opposite side of the bracket, as shown. The spindle is rotated to adjust the head rest back and forth by means of a threaded collar 79 pinned to the spindle and having a sleeve 80 extended to telescope over the sleeve 75, to afford a substantially dust-proof and water-proof connection. Rotation of the collar 79 serves to adjust the head rest back and forth on supporting frame 31, to suit the contour of the observer's head, without contacting or obstructing the movable system of the mounting.

The eye cups preferably comprise a ring 81 (Figs. 3 and 6), for each eye to which is fixed a flexible rubber guard 82. Each ring is fixed to the projecting lower end 83 of an arm 84 pivotally supported at its upper end by a screw 85 in the frame 31. These parts, including ring 81 and arm 83—84, are spaced from and independent of the instrument eye-piece and the gimbal elements, so as to avoid any interference therewith. The eye guards are movable toward and from each other to correspond with the interpupillary adjustment of the eye-pieces 11 by means which will now be described.

A spindle 86 has spaced threaded portions 87 threadedly engaged with studs 88 pivotally mounted in the arms, 84, respectively. The spindle, adjacent its center, has a portion 89 of reduced diameter (Fig. 6) engaged by an open bearing formed on a bracket 90 fixed on the frame 31. At one end of the spindle is a knurled handle or knob 91 by which it is readily rotated to swing the eye guards toward and from each other to suit the interpupillary distance of the observer's eyes and to locate the observer's pupils accurately with respect to the exit pupils of the instrument.

The part 92 mounted on the left hand end of frame 31, in Fig. 1, is a rheostat with an associated switch 93, these being parts of a circuit including also a lamp and a graticule plate illuminated thereby (not shown) for one of the optical systems, but as such parts are well understood in the art and form no part of the present invention, no further description thereof is required.

In the use of the invention on aircraft, for example, satisfactory performance of a six power telescope has been achieved with a natural period of oscillation of the gimbal system as small as one-quarter second. With a natural period of oscillation of the system of three-quarters of a second, it has been found that stabilization of the optic axis of a twenty power telescope is sufficient for sharp images, even when the supporting frame is subjected to vibrations as great as thirty thousandths of an inch at frequencies of the order of twenty cycles per second. Under these conditions, for example, an observer experiences the sensation of looking through a telescope mounted on a tripod on the ground.

It will be evident that this mounting can be applied successfully to any type of telescope installation in which the axis of the exit bundle of rays received by the observer is parallel to the axis of the entrance bundle of rays received by the instrument. It is likewise evident that the invention can be used to stabilize the direction of the optical axis of an aerial camera and other optical instruments.

It will thus be seen that the invention accomplishes its objects, and while it has been herein disclosed by detailed description of a preferred embodiment, it is to be understood that such disclosure is intended in an illustrative rather than a limiting sense, as it is contemplated that various modifications in the construction and arrangement of the parts will readily occur to those skilled in the art within the spirit of the invention and the scope of the appended claims.

We claim:

1. In an anti-oscillation mount for optical instruments, the combination of a support, a first element mounted on said support for pivotal movement about an axis, a second element mounted on said first element for pivotal movement about an axis, an optical instrument having an optical axis mounted on said second element, said elements having their centers of gravity located in said pivotal axes, respectively, and said pivotal axes extending normally to each other and transversely to the optical axis of said instrument, means comprising an elastic diaphragm connecting said support with one of said elements and said elements with each other and acting to elastically restore each of said elements to neutral position, and fluid pressure damping means arranged to dampen the action of each of said restoring means.

2. In an anti-oscillation mount for optical instruments, the combination of a support, a first element mounted on said support for pivotal movement about an axis, a second element mounted on said first element for pivotal movement about a different axis, an optical instrument having an optical axis mounted on said second element, said elements having their centers of gravity located in said pivotal axes, respectively, and said pivotal axes extending normally to each other and transversely to the optical axis of said instrument, and substantially frictionless means for restoring each of said elements to neutral position comprising a vented fluid pressure container portion having an elastic wall portion, one of said portions having a connection with the respective element to be restored and the other thereof having a connection with the part on which said element is mounted.

3. In an anti-oscillation mount for optical instruments, the combination of a support, a first element mounted on said support for pivotal movement about an axis, a second element mounted on said first element for pivotal movement about a different axis, an optical instrument having an optical axis mounted on said second element, said elements having their centers of gravity located in said pivotal axes, respectively, and said pivotal axes extending normally to each other and transversely to the optical axis of said instrument, a pair of stops interposed between said support and said first element and between said first and second elements, respectively, for limiting the movement of each of said elements, elastic means connecting said support with one of said elements and said elements with each other for restoring each of said elements to neutral position intermediate said stops, means for adjusting said elastic means for adjusting said position between said stops, and damping means arranged to dampen the action of each of said restoring means.

4. In an anti-oscillation mount for optical instruments, the combination of a support, a first element mounted on said support for pivotal movement about an axis, a second element mounted on said first element for pivotal movement about a different axis, an optical instrument having an optical axis mounted on said second element, said elements having their centers of gravity located in said pivotal axes, respectively, and said pivotal axes extending normally to each other and transversely to the optical axis of said instrument, stop means interposed between said support and said first element and between said first and second elements, respectively, for limiting the movement of each element, and substantially frictionless means for restoring each of said elements to neutral position intermediate said stop means comprising a vented fluid pressure container portion provided with an elastic wall having a rod attached centrally thereto and a rotatable, actuating nut portion threadedly engaged with said rod, one of said portions having a connection with said element and the other thereof having a connection with the part on which said element is mounted, for adjustably and elastically restoring said element to neutral position between said stop means and pneumatically damping the restoring movement thereof.

5. In an anti-oscillation mount for optical instruments, the combination of a support, a first element mounted on said support for pivotal movement about an axis, a second element mounted on said first element for pivotal movement about a different axis, an optical instrument having an optical axis mounted on said second element, said elements having their centers of gravity located in said pivotal axes, respectively, and said pivotal axes extending normally to each other and transversely to the optical axis of said instrument, and substantially frictionless means for restoring each of said elements to neutral position comprising an air pressure container provided with an elastic wall and with a vent of substantially greater length than diameter for maintaining air passing therethrough in a non-turbulent state of flow, said container having a connection with the respective element to be restored, and a rod attached to the center of said wall and having an adjustable connection with the part on which said element is mounted.

6. In an anti-oscillation mount for optical instruments, the combination of a support, a first element mounted on said support for pivotal movement about an axis, a second element mounted on said first element for pivotal movement about a different axis, an optical instrument having an optical axis mounted on said second element, said elements having their centers of gravity located in said pivotal axes, respectively, and said pivotal axes extending normally to each other and transversely to the optical axis of said instrument, each of said elements being mounted in anti-friction bearings provided with means for restraining axial movement of said element, substantially frictionless elastic means for yieldably restoring each of said elements to neutral position and damping means arranged for pneumatically damping the movements of said restoring means.

7. In an anti-oscillation mount for optical instruments, the combination of a support, a first element mounted on said support for pivotal movement about an axis, a second element mounted on said first element for pivotal movement about a different axis, an optical instrument having an optical axis mounted on said second element, said elements having their centers of gravity located in said pivotal axes, respectively, and said pivotal axes extending normally to each other and transversely to the optical axis of said instrument, each of said elements being mounted in substantially frictionless ball bearings having race surfaces extending angularly to the rotational axes thereof to resist axial movement, and a substantially frictionless device connecting said support with said first element and said elements with each other, respectively, for restoring each of said elements to neutral position comprising adjustable elastic means for producing restoring movement thereof, and air flow damping means arranged to dampen the movements of said elastic means.

8. In an anti-oscillation mount for optical instruments, the combination of a support, a first element mounted on said support for pivotal movement about an axis, a second element mounted on said first element for pivotal movement about a different axis, a binocular instrument comprising separate optical systems mounted on said second element on opposite sides of said axis thereof for movement symmetrically toward and from each other and substantially parallel with the axis of said first element for adjusting the interpupillary distance between said systems without substantially affecting the centers of gravity of said elements, said elements having their centers of gravity located in said pivotal axes, respectively, and said pivotal axes extending normally to each other and transversely to the optical axis of said instrument, elastic means connecting said support with said first element and said elements with each other, respectively, for restoring each of said elements to neutral position, and damping means arranged to dampen the movements of said restoring means.

9. In an anti-oscillation mount for optical instruments, the combination of a support, a first element mounted on said support for pivotal movement about an axis, a second element mounted on said first element for pivotal movement about a different axis, a binocular instrument comprising separate optical systems pivotally mounted on said second element on opposite sides of said axis thereof, a spindle rotatably mounted on said second element in threaded engagement with a part having connections with said systems, respectively, means for rotating said spindle to effect interpupillary adjustment of said systems toward and from each other and substantially parallel with said axis of said first element without substantially affecting the center of gravity of said elements, said elements having their centers of gravity located in said pivotal axes, respectively, and said pivotal axes extending normally to each other and transversely to the optical axes of said systems, elastic means connecting said support with said first element and said elements with each other, respectively, for restoring each of said elements to neutral position, and damping means arranged to dampen the movements of said restoring means.

10. In an anti-oscillation mount for optical instruments, the combination of a support, a first element mounted on said support for pivotal movement about an axis, a second element mounted on said first element for pivotal movement about an axis, a binocular instrument having separate optical systems mounted on said second element for movement toward and from each other to adjust the interpupillary spacing thereof without substantially affecting the center of gravity of said elements, said elements having their centers of gravity located in said pivotal axes, respectively, and said pivotal axes extending normally to each other and transversely to the optical axes of said systems, eye guards movably mounted on said support and provided with means for moving the same toward and from each other, independently of said elements, in accordance with said interpupillary adjustment of said systems, and elastic means connecting said support with said first element and said elements with each other, respectively, for maintaining said elements in neutral position.

11. In an anti-oscillation mount for optical instruments, the combination of a support, a first element mounted on said support for pivotal movement about an axis, a second element mounted on said first element for pivotal movement about an axis, a binocular instrument having separate optical systems mounted on said second element for movement toward and from each other to adjust the interpupillary spacing thereof without substantially affecting the center of gravity of said elements, said elements having their centers of gravity located in said pivotal axes, respectively, and said pivotal axes extending normally to each other and transversely to the optical axes of said systems, eye guards of flexible material movably mounted on said support, a spindle rotatably mounted on said support in threaded engagement with said eye guards and provided with means for rotating the same to adjust said guards toward and from each other independently of said elements in accordance with said interpupillary adjustment of said systems, and elastic means connecting said support with said first element and said elements with each other, respectively, for maintaining said elements in neutral position.

12. In an anti-oscillation mount for optical instruments, the combination of a support, a first element mounted on said support for pivotal movement about an axis, a second element mounted on said first element for pivotal movement about an axis, a visual viewing instrument having an optical axis mounted on said second element, said elements having their centers of gravity located in said pivotal axes, respectively, and said pivotal axes extending normally to each other and transversely to the optical axis of said instrument, a head rest mounted on said support for movement toward and from said axes independently of said elements, elastic means connecting said support with said first element and said elements with each other, respectively, for restoring each of said elements to neutral position, and damping means arranged to dampen the movements of said restoring means.

13. In an anti-oscillation mount for optical instruments, the combination of a support, a first element mounted on said support for pivotal movement about and axis, a second element mounted on said first element for pivotal movement about an axis, a visual viewing system mounted on said second element, said elements having their centers of gravity located in said pivotal axes, respectively, and said pivotal axes extending normally to each other and transversely to the optical axes of said system, an elongated head rest, cooperating parts on said support and the ends of said rest, respectively, for supporting and guiding the same for adjustment toward and from said support, a spindle rotatably connected with said rest and in threaded enagement with said support and provided with means for rotating the same for adjusting the position of said rest independently of said elements, and elastic means connecting said support with said first element and said elements with each other, respectively, for restoring each of said elements to neutral position.

14. In an anti-oscillation mount for optical instruments, the combination of a support, a first element mounted on said support for pivotal movement about an axis, a second element mounted on said first element for pivotal movement about a different axis, a binocular instrument mounted on said second element and having separate optical systems movable toward and from each other to adjust the interpupillary spacing thereof, said elements having their centers of gravity located in said pivotal axes, respectively, and said pivotal axes extending normally to each other and transversely to the optical axes of said systems, a pair of eye guards movably mounted on said support for adjustment toward and from each other in accordance with the interpupillary adjustment of said systems, a head rest movably mounted on said support for adjustment toward and from said elements, and elastic means connecting said support with said first element and said elements with each other, respectively, for restoring each of said elements to neutral position.

15. In an anti-oscillation mount for optical instruments, the combination of a support, a first element mounted on said support for pivotal movement about an axis, a second element mounted on said first element for pivotal movement about a different axis, a visual viewing instrument having an optical axis mounted thereon, said elements being mounted in substantially frictionless bearings provided with means for resisting axial movements thereof, said elements having their centers of gravity located in said pivotal axes and said pivotal axes extending normally to each other and transversely to the optical axis of said instrument, a head rest movably mounted on said support for adjustment toward and from said elements, eye guard means movably mounted on said support for adjustment toward and from each other parallel with said elements, and substantially frictionless elastic means connecting said support with said first element and said elements with each other, respectively, for restoring each of said elements to neutral position and damping the restoring movement thereof.

16. In an anti-oscillation mount for optical instruments, the combination of a support, a first element mounted on said support for pivotal movement about an axis, a second element mounted on said first element for pivotal movement about a different axis, said elements being mounted in anti-friction bearings provided with means for resisting axial movement thereof, a binocular instrument having separate optical systems mounted on said second element for movement toward and from each other substantially normal to one of said axes and parallel to the other thereof without substantially affecting the center of gravity of said elements, said elements having their center of gravity located in said pivotal axes and said pivotal axes extending normally to each other and transversely to the optical axes of said systems, a head rest movably mounted on said support for adjustment toward and from said elements, a pair of eye guards mounted on said support for adjustment toward and from each other to correspond with the interpupillary adjustment of said systems, elastic means connecting said support with said first element and said elements with each other, respectively, for restoring each of said elements to neutral position, and air flow damping means arranged to dampen the movements of said restoring means.

17. In an anti-oscillation mount for optical instruments, the combination of a support, a gimbal comprising a first element pivotally mounted on said support and a second element pivotally mounted on said first element, an optical instrument on said second element, said elements having co-planar axes normal to each other and transverse to the optical axis of said instrument with their intersection at the center of gravity of said pivoted elements of said gimbal, said elements being mounted in anti-friction bearings provided with means for resisting axial movement thereof, a counterbalance adjustably mounted on each of said elements for maintaining its center of gravity in the pivotal axis thereof, stop means interposed between said support and said first element and between said first and second elements, respectively, for limiting the movement of each element, and a substantially frictionless means for restoring each of said elements to neutral position intermediate said stop means comprising a vented fluid pressure container portion having an elastic wall portion, one of said portions having a connection with the respective element to be restored and the other thereof having a connection wtih a part on which said element is mounted, for elastically restoring each of said elements to neutral position and pneumatically damping the restoring movement thereof.

BRIAN O'BRIEN.
HOBERT W. FRENCH, JR.

(References on following page)

REFERENCES CITED

The following references are of record in the file of this patent:

UNITED STATES PATENTS

| Number | Name | Date |
|---|---|---|
| 1,018,771 | Neuburger | Feb. 27, 1912 |
| 1,221,902 | Pedersen | Apr. 10, 1917 |
| 1,482,244 | Morton | Jan. 29, 1924 |
| 1,502,173 | Chamberlin | July 22, 1924 |
| 1,586,070 | Cooke | May 25, 1926 |
| 1,794,600 | Field | Mar. 3, 1931 |
| 2,131,163 | Casey | Sept. 27, 1938 |
| 2,134,932 | Smith | Nov. 1, 1938 |
| 2,213,832 | Braddon | Sept. 3, 1940 |
| 2,295,198 | Braddon | Sept. 8, 1942 |
| 2,357,377 | Bausch | Sept. 5, 1944 |
| 2,364,363 | Howell | Dec. 5, 1944 |
| 2,382,616 | Del Riccio | Aug. 14, 1945 |

FOREIGN PATENTS

| Number | Country | Date |
|---|---|---|
| 188,375 | Great Britain | Nov. 6, 1922 |